United States Patent [19]

Becker et al.

[11] Patent Number: 4,747,901

[45] Date of Patent: May 31, 1988

[54] PROCESS FOR MAKING A STRESS-FREE EMBOSSED AND ORNAMENT SURFACE COVERING

[75] Inventors: Stephen E. Becker, Marietta; John S. Forry, Lancaster; Walter J. Lewicki, Jr., Lancaster; Richard M. Ringer, Lancaster, all of Pa.

[73] Assignee: Armstrong World Industries, Inc., Lancaster, Pa.

[21] Appl. No.: 806,829

[22] Filed: Dec. 10, 1985

[51] Int. Cl.[4] .......................... B31F 1/00; B29C 59/00; B28B 11/08; B32B 3/00

[52] U.S. Cl. ..................................... 156/220; 156/222; 264/119; 264/293; 428/172

[58] Field of Search ............... 156/219, 220, 252, 286, 156/221, 222, 209, 77, 85, 90; 264/119, 284, 257, 258, 293; 427/271, 264, 275, 276, 277, 278; 428/204, 156, 172, 187

[56] References Cited

U.S. PATENT DOCUMENTS

| | | | |
|---|---|---|---|
| Re. 31,373 | 9/1983 | Ungar et al. | 156/219 |
| 4,131,664 | 12/1978 | Flowers et al. | 156/285 |
| 4,140,566 | 2/1979 | Burton et al. | 156/219 |
| 4,259,285 | 3/1981 | Baumgartl et al. | 264/284 |
| 4,273,819 | 6/1981 | Schmidle et al. | 156/220 |
| 4,312,686 | 1/1982 | Smith et al. | 156/220 |
| 4,420,351 | 12/1983 | Lussi et al. | 264/119 |
| 4,604,312 | 8/1986 | Creighton et al. | 156/252 |

Primary Examiner—Donald E. Czaja
Assistant Examiner—Louis Falasco

[57] ABSTRACT

The process for making a dimensionally stable, embossed, ornamented surface covering suitable for use as a floor or wall tile, involving, laminating and embossing a resinous thermoplastic top layer having a plurality of openings extending through its thickness to allow the escape of air and extending to a base material or substrate of pre-formed, low-density, reinforced, porous thermoplastic material. The composite structure is subjected to heat and pressure in a flatbed press to emboss the structure without deformation, fuse the resins and render the top layer substantially impermeable. The improvement comprises the use of a rigid vinyl wear layer in a two step embossing operation involving a first embossing step in a heated press and immediately thereafter a second embossing step in a cooled press. The improvement also comprises partly providing a second resinous thermoplastic layer between the top layer and the base material, the second layer being capable of allowing passage of air through its thickness during the embossing and fusion step, and being adapted to soften and flow before the top layer does, thereby assuring complete closure of all openings in the top layers of the product.

3 Claims, 2 Drawing Sheets

PROCESS FOR MAKING A STRESS-FREE EMBOSSED AND ORNAMENT SURFACE COVERING

CROSS-REFERENCE TO RELATED APPLICATION

The present application is an improvement in the invention disclosed in co-pending application Ser. No. 660,004, filed Oct. 11, 1984.

BACKGROUND OF THE INVENTION

This invention relates generally to an improved, dimensionally stable, embossed, tile surface covering and the process for forming it. More particularly, the invention relates to such a tile surface covering having deeply embossed areas and an improved replication of the embossed surface of the embossing plate.

THE PRIOR ART

It has been previously known to produce embossed resinous surface coverings wherein the embossing was achieved chemically or mechanically. It has been further known to provide decorative designs on such surface covering by applying variously-colored inks to either the top surface of the base material, or to a film wear layer thereon, prior to, or subsequent to, the embossing of the structure. However, there have been problems in the past involving distortion of the material and the design thereon, registration of designs and embossing, the inability to obtain full replication of embossing surface detail, development of stresses in the product created during the formation thereof, and dimensional stability of the product, in the use of mechanical embossing where different depths of embossing combined with full replication of the embossing surface was desired.

There has also been a problem involving complete sealing of the air-release openings, such as those used in the process of co-pending application Ser. No. 434,631, filed Oct. 15, 1983, now abandoned and continuation-in-part application thereof Ser. No. 619,318, filed June 11, 1984, now U.S. Pat. No. 4,604,312 when embossing plates were used which were very deep and had smooth recessed portions.

U.S. Pat. No. 3,562,059 relates to a method of decorating a plastic foam form by placing the printed face of the polymer film blanked to the shape of the foam form, against the foam, covering the film with a woven Teflon cloth, applying heat and pressure to the face of the cloth, and then stripping the cloth from the film.

U.S. Pat. No. 3,180,776 relates to the ornamentation of plastic articles by forming a color support blank of incompletely cured, filled, resinous material, printing decorations thereon with appropriate inks, and subjecting the blank to a high frequency heat treatment to harden the inks. A transparent, incompletely cured, filled, plastic sheet of similar resinous material may then be placed on the previously formed blank, with the printed surface on the color support blank in contact with the transparent sheet. The product is formed by molding and fusing the material by using heat and pressure.

U.S. Pat. No. 3,024,154 relates to the art of embossing thermoplastic film which comprises, heating a relatively thick sheet of thermoplastic material to a temperature above its softening temperature and that of the film, bringing one surface of the film in a relatively cool condition into contact with the surface of the thicker sheet, moving the film and sheet together between a cooled, indented embossing element and a backing element, to press the film and sheet into the indentations in the embossing element, and then cooling the composite structure.

U.S. Pat. No. 3,325,332 relates to a method of laminating a relatively thick plastic film to a compatible plastic foam by heat-softening the foam and pre-heating only the contacting surface of the film and then pressing the film and foam together.

U S. Pat. No. 3,658,617 relates to a method for forming a laminated floor covering wherein a decorated wear layer is provided on a strippable backing which is removed prior to passing the wear layer into the nip of the roll structure along with an extruded adhesive, a reinforcing member, and a foam or other permanent backing to form a laminated structure wherein the wear layer, the reinforcing structure, and the permanent backing are all adhesively bound to each other.

U.S. Pat. No. 4,312,686 teaches making an embossed floor tile by the release sheet transfer method. A design is printed on a release paper and transferred to a hot plastic web. A film is then laminated to the printed web to provide a protective wear coat. The product will be subsequently embossed.

U.S. Pat. No. 1,861,663 teaches that two perforated sheets (porous base) superimposed on each other can be united with material flowing into the perforations and air being pushed out in the process. The product formed is a floor covering.

Other U.S. patents having general relationships to various features of the present invention include U.S. Pat. Nos. 2,558,791; 2,991,216 and 4,289,559.

The problems previously indicated herein have not been satisfactorily solved by the foregoing prior art.

SUMMARY OF THE INVENTION

This invention relates to a dimensionally stable, embossed, ornamented surface covering which may be in the form of a floor or wall tile and process for making it, wherein a first resinous, thermoplastic layer which is transparent after fusion and which has openings extending through its thickness, and a second resinous layer capable of allowing passage of air through its thickness, are placed on the top surface of a porous, low-density thermoplastic base material. The second resinous layer is adapted to soften and flow prior to the softening and flowing of the first resinous layer in the subsequent embossing and fusion step. The prior melting and flowing of the second resinous layer assists and assures complete closure of all openings in the top layers thereby rendering them substantially impermeable after fusion.

The first resinous layer may be in the form of a film, a thin layer of sintered dryblends or powder or gelled plastisol. The openings extending through the thickness of the first resinous layer may be initially present therein or may be formed at a later time, for example, by perforating. However, the openings in the first layer must be present prior to the embossing and fusion step. The second resinous layer may be in the form of a plastisol, a perforated film, a sintered resinous powder, an open-celled foam, or a dryblend, but must be capable of allowing passage of air through its thickness when air is forced through the openings in the first layer by pressure of the embossing plate thereon prior to fusion of the resins.

The porous base material may be a lightly sintered resinous dryblend structure or a sintered powder having hollow non-thermoplastic particles therein or an open cell foam or any type of porous thermoplastic material. The first resinous layer may be provided on a release carrier and may be decorated on the surface which faces away therefrom. The second resinous layer may be applied over the decorated surface of the first layer, or on top of the base material. Optionally, if the first and second layers are transparent after fusion, the decoration may be provided on the top surface of the base material. The top layers may be cut to the desired tile dimensions in register with the design portions while they are on the release carrier without cutting the carrier, interfaced with the top surface of a piece of the base material of similar size, and the release carrier removed, or, the first and second layers may be interfaced with the top surface of a sheet of the base material, and the top layers and base material cut in register with the design on the first layer simultaneously, after removal of the release carrier. Adhesive may be applied to the bottom surface of the second layer or to the top surface of the base material.

When laminating the top layers to the base material, heat at a temperature sufficient only to activate the adhesive is used, together with light pressure, to assure bonding of the second layer to the base material. In both cases, the base material with the first and second layers thereon, is then subjected to heat and cooling to emboss the structure, fuse the resins and render the first and second layers substantially impermeable. The first and second layers may be vinyl or other thermoplastic material, and may be perforated to allow air trapped in the deeper recesses of the embossing plate to escape therethrough. The perforations are sealed during the embossing and fusing of the resins in the composite structure.

The prior art problems previously indicated herein are solved by the present invention. Since the base material is first a porous low-density material with hollow, non-thermoplastic particles therein, it can be compressed vertically in a flatbed press with a minimum of lateral flow. This permits deeper, more clearly defined embossing and less distortion in the product. The process further substantially eliminates the distortion of the decoration on the structure, and of the base material which is normally encountered when using a flatbed embossing press due to entrapped air, especially with low density compositions that are difficult to heat and cool. Lack of distortion of the ornamentation due to entrapped air in the process of this invention, of course, makes it possible to easily emboss in register with the decoration. As is commonly known, thermoplastic films or layers are not dimensionally stable when heated sufficiently so that they may be embossed. They tend to expand or contract differently in different parts of the sheet.

The process herein is particularly useful for use with a rigid vinyl material as the first resinous layer to function as the wear layer for the flooring product formed. Because a rigid vinyl material or like rigid material is being utilized, the embossing is now being carried out as a two-step operation involving a first heating step, followed immediately by a second cooling step, both heating and cooling steps being carried out while embossing pressure is being applied in a press.

DESCRIPTION OF THE PREFERRED EMBODIMENTS

Figure 1:
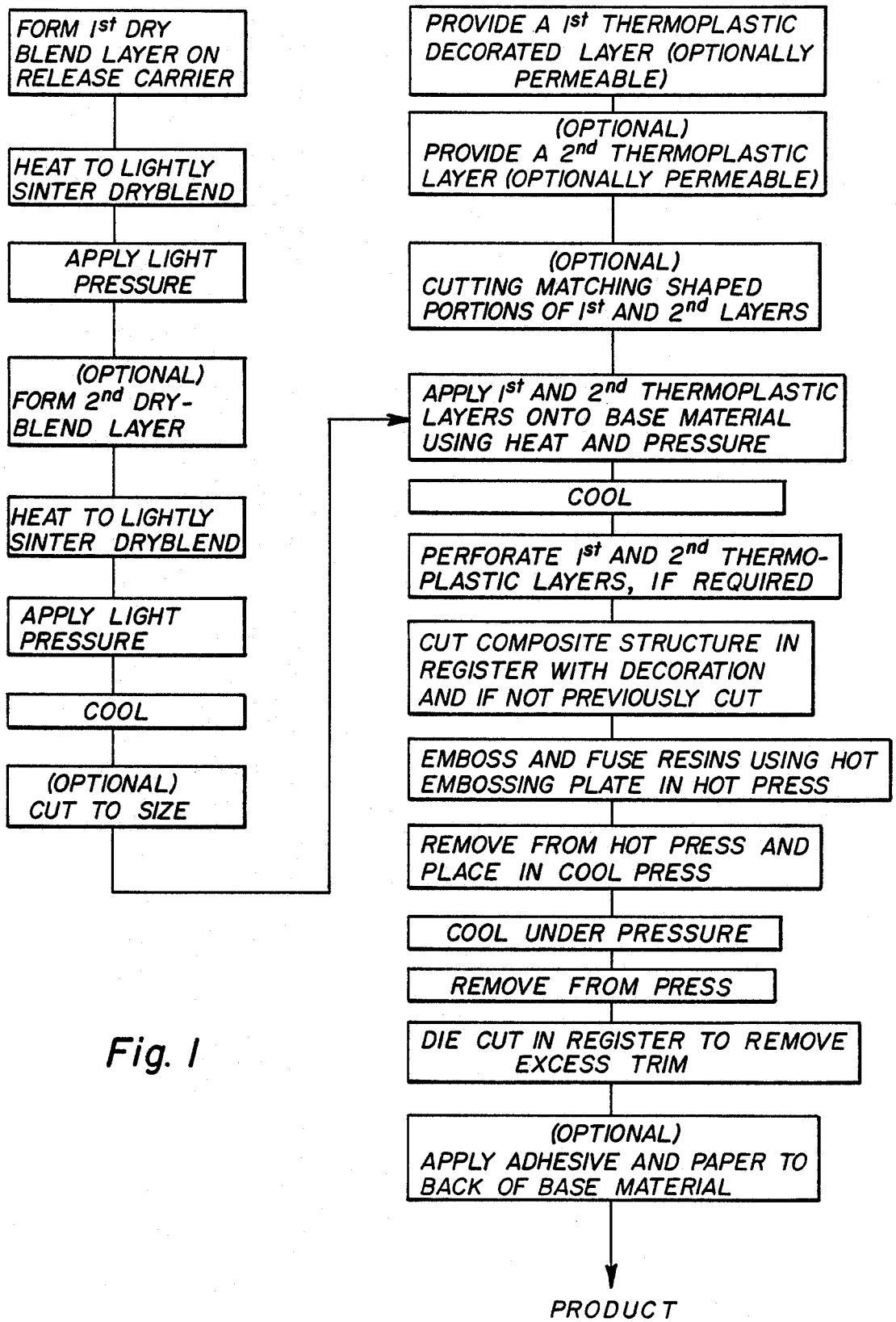
FIG. 1 is a flow diagram depicting the steps followed in carrying out the embodiments of the process of this invention.

The flow diagram of FIG. 1 illustrates various embodiments of the invention.

In the first embodiment of the invention, the manufacturing process begins with the formation of a porous low-density base material. As indicated in the flow chart of FIG. 1, a first dryblend layer is formed on a release carrier. In the formation of the base material a mixture of resinous dryblend particles and expanded perlite is prepared. The dryblend is in the form of a free-flowing homogeneous mixture of unfused thermoplastic resin particles, including liquid vinyl plasticizer, filler, pigment, and vinyl stabilizer.

Poly(vinyl chloride) is the preferred resin for use in forming the surface covering of the present invention, although copolymers of vinyl chloride with minor proportions of other materials such as vinyl acetate, vinylidene chloride, other vinyl esters such as vinyl proprionate, vinyl butyrate as well as alkyl substituted vinyl esters may be used.

Other thermoplastic resins which are receptive to use in the process herein may be used. These may include, for example, polyethylene, polyurethanes, polyesters, polyamides, polyacrylates (e.g., polymethyl methacrylate) as well as polymers derived from acetates and cellulose esters.

The free-flowing mix of resin, plasticizer, stabilizer, pigment, and filler may be readily formed by adding the resin, for example a homopolymer of vinyl chloride in the form of discrete particles, along with the vinyl resin plasticizer such as di-2-ethylhexyl phthalate, butylbenzyl phthalate, epoxidized soybean oil, or tricresyl phosphate, filler, pigment, and suitable vinyl resin stabilizers to a mixer, or blender, such as a Henschel blender, where they are mixed under moderate heat, for instance, at a temperature of about 160°–220° F., for a period of time to ensure that the liquid plasticizer and the stabilizer become absorbed and thus diffused throughout the resin particles and the remaining ingredients adsorbed thereon. Care is taken so that no fusion of the resin particles occurs during the mixing, and the temperature must be kept below that at which such would occur. Generally speaking, the addition of fillers and/or pigments to the mix may be made either initially, at the end of the mixing cycle when the resin particles remain relatively warm, or after the dryblend particles have been mixed and cooled.

The dryblend composition useable in the present invention may include the following ingredients in the indicated ranges, based on 100 parts of resin:

| Ingredients | Parts by weight |
| --- | --- |
| Poly(vinyl chloride) medium molecular weight general purpose grade resin | 50–100 |

-continued

| Ingredients | Parts by weight |
|---|---|
| Poly(vinyl chloride) low molecular weight general purpose grade resin | 50-0 |
| Dioctyl phthalate, plasticizer | 25-75 |
| Organatin stabilizer | 1-3 |
| Titanium dioxide paste (50% in DOP) | 0-5 |
| Limestone (50 mesh) filler | 0-200 |

The dryblend/perlite mix used in the present invention is formed by a simple mixing or tumbling together of the two dry materials until a uniform blend is obtained. About 90 parts by weight of the dryblend and about 10.5 parts by weight of the perlite are used.

The quantity of perlite used in the composition, however, can be varied considerably, but the upper limit is determined by the ability of the composition to hold together in a useful manner after heating and consolidation. This upper level is affected by the particle size of the perlite used, and, since we add or mix our proportions by weight, the density of the perlite particles. The perlite particles preferred for use in the present invention is Spherepack MM-100, sold by Patentech Corporation, Shepherd Grove, Ill. The particle size of the perlite useable in the present invention ranges from about 35 to 850 microns. The average particle size for the Spherepack MM-100 perlite is about 75 microns. The effective range of the quantity of perlite useable would be between 2 and 15 percent by weight when combined with a quantity of dryblend in the range of from about 98 to 80 percent by weight. The preferred range of the perlite used would be about 5 to 13 percent by weight, and the most preferred range would be about 8 to 12 percent by weight. The levels of other types of perlite, for example, the 3.5 and 10 pound/cubic foot bulk density materials, may differ due to their different particle size and/or density. Although it is preferred that the base material should be formed using expanded perlite as the hollow particles, it is contemplated that other hollow particles of, for example, glass, ceramic, or inorganic materials could be used within the scope of the invention.

A layer of the perlite-containing dryblend mixture about 100 mils thick is then formed on a release-surfaced carrier and heated to a temperature sufficient to cause surface portions of the resinous particles to melt slightly and stick together at their points of contact with each other. The resulting base material is now in a friable but suitable condition to be handled for further processing. It is also porous, allowing it to be subsequently compressed in a vertical direction with minimum lateral flow.

The preferred reinforced, sintered dryblend and expanded perlite composite is a unique porous structure in which each individual pore is reinforced by the rigid cellular structure of the individual expanded perlite particle. The collective effect of the many reinforced pores contributes to a great extent to the necessary dimensional stability and light weight of the product, while at the same time still allowing crushability during the embossing step with limited lateral flow.

Although it is preferred that the base material should be as described, other porous structures such as open-celled thermoplastic resin foams (e.g., vinyl foam), thermoplastic matting, open-cell polyurethane foam, and the like may be used; however, results generally are not as good since print distortion, material extrusion, and structural collapse may occur during subsequent processing operations. It is also possible to place the above described base material on a reinforcing layer of material, for example, consolidated scrap vinyl.

In one embodiment of the invention, a dimensionally stable release carrier is then provided with a first resinous thermoplastic film preferably about 4 mils thick and having ornamented design portions on the surface thereof facing away from the carrier. The film may, however, range from about 0.1-15.0 mils in thickness, and, at this point, may be permeable or impermeable, but must be capable of becoming permeable when the composite structure is subsequently embossed. The film may be cast, calendered, extruded, or laminated onto the release carrier and, the design or decoration may be applied either prior to, or subsequent to, application of the film to the release carrier. Also, it is recognized that the decoration may be applied to the top surface of the base material and non-decorated films or coatings applied thereover. The first resinous film preferably comprises poly(vinyl chloride) and/or vinyl chloride copolymers (e.g., vinyl chloride and acrylic monomers and copolymers such as ethylene-acrylic acid). A rigid vinyl is the preferred film. However, other thermoplastic materials such as polyesters, polyurethanes, polyamides, polyolefins (e.g., polyethylenes), polyacrylates polypropylene, and the like could be used in the invention. Adhesive may be applied to the decorated surface of the film or, the adhesive may be in the ink or may be combined with the ink.

A second resinous layer which also may be in the form of a non-rigid or semi-rigid film may then be provided either on the exposed surface of the first layer or on the top surface of the base material. As previously stated the decoration may be either on the first resinous layer surface which faces away from the release carrier, or on the top surface of the base material.

The first and second layers may be die cut to the desired dimensions in register with the design while they are on the release carrier, but without cutting the carrier. The base material is cut into shapes corresponding to those of the cut portions of the top layers.

The decorated cut portions of the top layers are then placed on the top surface of the shaped portions of the base material, the release carrier is removed and the top layers are perforated. The die-cut layers are laminated to the base and may be preheated to only warm the adhesive so that lamination can be carried out at a relatively low temperature. The pieces of base material may also be pre-heated, but not all the way through. The composite structure so formed less release carrier becomes an embossable assembly when added to an embossing plate and Teflon sheet. This will then be put into a flatbed press for the initial embossing operation. The embossable assembly will actually be placed in two separate presses to complete the total embossing operation. The first embossing press will have heated platens which will heat the embossing plate face to approximately 320° F. Embossing will be carried out for 8 seconds. The embossing assembly will then be removed from the first embossing press and immediately placed in a second embossing press which will have cooled platens. The embossing plate will then be brought down to approximately 100° F. while embossing pressure is applied.

During the heating operation, the resinous top layers will soften and flow and the perforations therein will be sealed. During the hot embossing process, the temperature of the rigid vinyl is raised above its glass transition temperature to stress relieve the vinyl and to provide the vinyl with the appropriate embossed configuration. The subsequent embossing step with the cooling phase brings the temperature for the rigid vinyl down below its glass transition temperature so that the product will cool in its embossed shape, no stresses will be developed therein and the product will be set with the desired embossed configuration.

The embossable assembly is then removed from the cool embossing press. The embossable assembly is then disassembled to remove the embossing plate and Teflon sheet, and the remaining structure may now be die cut in register to remove excess trim. The product may have an adhesive applied to the back of the base material and a release paper would then be placed over the adhesive to form the end product.

In the second embodiment of the invention the same material and procedures are used except that the top layer and base material are die-cut simultaneously in register with the design portions after the first and second layer or films have been applied to the top surface of the base material, and after separation of the release carrier.

The following examples are given for purposes of illustration, but the invention is not limited to these examples. All parts and percentages are by weight unless otherwise specified.

EXAMPLE I

In forming the base material for the surface covering of the present invention, dryblend granules were prepared by mixing the following components together in a conventional Herschel dryblending apparatus through a heat history from ambient conditions to 200° F. to ambient conditions, using the following ingredients in the indicated ranges:

| Ingredients | Parts by Weight |
| --- | --- |
| Poly(vinyl chloride) medium molecular weight general purpose grade resin | 66.6 |
| Poly(vinyl chloride) low molecular weight general purpose grade resin | 33.4 |
| Dioctyl phthalate | 25–75 |
| Organotin Stabilizer | 2 |
| Titanium Dioxide Paste (50% in DOP) | 2 |
| Limestone (50 Mesh) Filler | 100 |

The dryblend granules formed as above were then mixed with perlite particles in the following proportions:

| | Parts by Weight |
| --- | --- |
| Dryblend particles | 90 |
| *Perlite (Spherepack MM-100) | 10.5 |
| | 100.5 |

*A low density, hollow silica glass particle available from Patentech Corporation, Shepherd Grove, Illinois.

The above dry materials were mixed together by a simple tumbling operation until a uniform blend was obtained.

The dryblend mixture was deposited on a release-surfaced carrier to form a uniform layer of about 100 mils thick. Heat was then applied via infra-red irradiation of the top surface and electric heating of the lower platen below the carrier for a period of about 2 minutes to bring the mixture to a temperature of about 375° F. to cause partial melting of surface portions of the dryblend granules and cause them to stick together at their points of contact. After cooling, the composite sheet, which was approximately 100 mils thick, was cut into about 7 by 7 inch tile size portions which were low density, porous, and in a suitable condition for handling and further processing procedures.

A 3–4 mil poly(vinyl chloride) first coating layer was applied to a 1.42 (0.036 mm) thick polyester release carrier and heated to an interface temperature of about 290° F. (143° C.). The resulting film was then printed with vinyl inks in a decorative pattern. A second layer consisting of a 1-mil (0.025 mm) poly(vinyl chloride) coating, and in this case containing white pigment, is applied to the decorated surface of the poly(vinyl chloride) film and heated to an interface temperature of 270° F. (132° C.).

The decorated first layer and second layer forming a resinous thermoplastic film or wear layer are then cut into shapes and sizes corresponding to those of the base material without cutting the release carrier. The first and second films or layers were then applied to the top surface of the pieces of the base material which were pre-heated to only warm the top portions thereof, the second layer thus being positioned between the decorated upper film layer and the top surface of the base material. If an adhesive is used in the process, it is applied to the decorated surface of the first coating or film layer to assure good bonding of the first and second layers. The adhesive may be an acrylic type lacquer having the following composition:

| | Parts by Weight |
| --- | --- |
| *A21LV Resin | 13 |
| Ethyl Acetate | 43 |
| Methyl Ethyl Ketone | 13 |
| | 69 |

*A methyl methacrylate resin available from Rohm & Haas, Philadelphia, Pennsylvania.

Heat was applied from a silicone roller heated at about 400° F. to soften the adhesive on the decorated surface of the film, and light pressure was applied by a roll laminator to bond the second film layer to the base material. After cooling, the release carrier was removed. The top film layers were then perforated using a pin roll to provide a plurality of openings spaced about 5/16″ apart.

Figure 2:
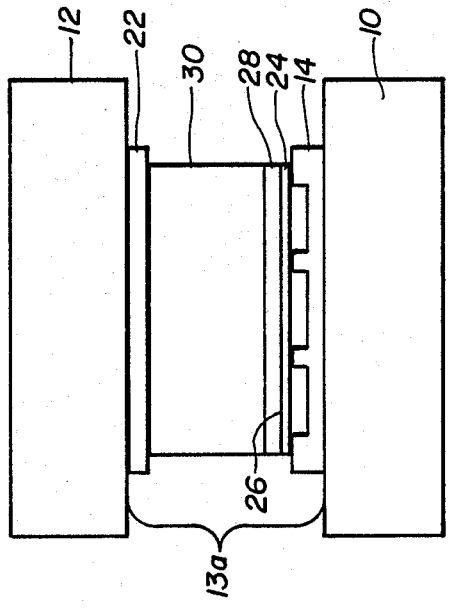
FIGS. 2 and 3 are schematic showings of the different structure being placed in the platens of an embossing press.

Looking at FIG. 2, an embossable assembly 13 must be formed because the product to emboss must be moved from a hot embossing press to a cold embossing press. Therefore, there must be an assembly capable of being moved from one press to the other. The embossable assembly is formed from, first, an embossing plate 14 which is placed on the bottom of the assembly with its embossing surface facing upward. The above described structure which is formed with the two film layers 16 and 18 and base 20 is then placed on top of the embossing plate with the top of the two film layers being placed against the embossing surface. This means that the backing or base material now faces upward. Finally, a Teflon sheet 22 is placed on the backside of the backing or base material. There is therefore formed an embossable assembly comprising an embossing plate, thereabove the two film layers with the lower film layer engaging or contacting the embossing surface of the embossing plate. Over the film layers, there is positioned the base material and then on the back side of the base material, there is provided a Teflon sheet. The Teflon sheet merely functions so that the backing material will not stick to a press platen.

This embossable assembly is now placed in a hot flatbed embossing press which has its top platen 12 heated to 450° F. and its bottom platen 10 heated to 600° F. This will cause the embossing plate to be heated to approximately 320° F. Pressure is applied to the embossable assembly and the embossable assembly is maintained under pressure between the two platens of the hot press for approximately 8 seconds. The press is opened, the pressure is relieved, and the embossable assembly is immediately moved to a cold embossing press. In the cold embossing press, the top platen and bottom platen are both cooled to approximately 46° F. This helps the embossing plate cool down to approximately 100° F. before the press is again opened. The cooled press would maintain the embossing pressure on the embossable assembly for 8 seconds.

As pressure is applied in the first heated embossing press, the trapped air escapes through holes in the top film layers. The heat then fuses the resins and allows the holes to seal under continuing heat resulting in an impermeable top film. Since the film layer is a rigid vinyl, the heating in the hot embossing press will carry the temperature that the film is heated to above its glass transition point to relieve all the stresses in the film and to shape the film in the form of the embossing press. As the film cools down in the cool embossing press, the embossed configuration is maintained, the rigid vinyl layer cools down below its glass transition temperature and is set in the embossed configuration in a stress-free condition.

The products were then allowed to cool under pressure, removed from the press, and die-cut in register to remove excess trim. A water-based acrylic type adhesive having the following formulation was then applied to the back of the finished pieces to facilitate their subsequent attachment to a surface such as a wall or floor:

|  | Parts by Weight |
| --- | --- |
| *Polyacrylic Emulsion (UCAR174) | 98.62 |
| **Sodium Polyacrylic Solution (Alcogum 6940) | 1.31 |
| ***1,2-Benzisothiazolin-3-one (Proxel CRL) | 0.07 |

*available from Union Carbide, Danbury, Connecticut
**available from Alco Chemical Co., Philadelphia, Pennsylvania
***available from ICI America, Inc., Wilmington, Delaware A release-coated paper was then applied onto the adhesive. The paper is easily removable at the time of installation of the product on a substrate. The product is a stress-free, decorated, embossed surface covering having non-curling tendencies.

EXAMPLE II

A dimensionally stable, embossed, ornamented surface covering was formed by using the same base material (dryblend - perlite mixture) and procedures as in Example I. The decorated first and second film layers were also provided using the same materials and procedures as in Example I. In the formation of this surface covering, however, neither the first and second film layers nor the base material were cut prior to lamination of the films and base material. In this procedure, the decorated surface of the first film layer was interfaced with the top surface of the second film layer prior to application of the films to the base material, and heat and pressure was applied to activate the adhesive. After cooling, the release carrier was removed, the films perforated and the films and base material cut simultaneously in register with the design on the film.

The embossing of the structure, fusing of the resins, die-cutting to remove excess trim, and application of adhesive and release paper to the back of the product were done in the same manner and using the same materials as in Example I.

The surface covering formed is substantially dimensionally stable, stress free and has non-curling tendencies; is relatively easier and more economical to produce; and provides an improved, more aesthetically appealing product having improved surface maintenance properties.

It has been found that the perforations which aid in air release during embossing do not completely seal in some cases, for example, where the embossing plate is very deep and does not have enough raised areas to mechanically help seal the perforations, e.g., a deep, smooth, and recessed plate. Unsealed holes allow penetration of stains to the interior of the finished product in use, which is undesirable. By incorporating a second resinous thermoplastic layer beneath the decorated top layer or film, which second layer will soften in the embossing and fusion step prior to fusion of the top decorated film, the healing of the openings in the top film is assisted. This is because the greatest heat is generated within the structure of the base which is next to the more flowable second layer.

The second resinous thermoplastic layer may be a poly(vinyl chloride) layer, advantageously in the form of a plastisol or in the form of a sintered powder layer, such as that designated VYFS by Union Carbide. It could also be any of the other thermoplastic materials mentioned above for the base material, provided that it softens and starts to flow prior to the softening and flowing of the first layer at a lower temperature than does the first, or top, perforated film or layer, thereby ensuring complete closure of the perforations in the final product.

In the third embodiment of the invention, the second layer 18, next to the base layer 20 of dryblend, is replaced with a dryblend layer formed as part of the base layer.

In forming the base material for the surface covering of the present invention for products having deep grout lines, smoother top surfaces, and improved soil retardant surface layers, the following procedure is used. Dryblend particles were prepared by mixing the following components together in a conventional Henschel dryblending apparatus through a heat history from ambient conditions to 200° F. to ambient conditions, using the following ingredients in the indicated ranges.

| Ingredients | Dryblend 1 Parts by Wt. | Dryblend 2 Parts by Wt. |
| --- | --- | --- |
| Poly(vinyl chloride) medium molecular wt. general purpose grade resin | 66.6 | 66.6 |
| Poly(vinyl chloride) low molecular wt. general purpose grade resin | 33.4 | 33.4 |
| Dioctyl Phthalate | 25–75 | 25–75 |
| Organotin Stabilizer | 2 | 2 |
| Titanium Dioxide Paste | 15 | — |

| Ingredients | Dryblend 1 Parts by Wt. | Dryblend 2 Parts by Wt. |
| --- | --- | --- |
| (50% in DOP) | | |
| Limestone (50 mesh) Filler | 100 | 100 |

The dryblend granules formed as above were then mixed with perlite particles in the following proportions:

| | Formula 1 | Formula 2 |
| --- | --- | --- |
| Dryblend Type | Dryblend 1 | Dryblend 2 |
| Weight | 95.8 | 89.5 |
| *Perlite (sphere pack MM-100) | 4.2 | 10.5 |
| | 100.0 | 100.0 |

*A low density, hollow silica glass particle available from Patentech Corporation, Shepherd Grove, Illinois.

Figure 4:
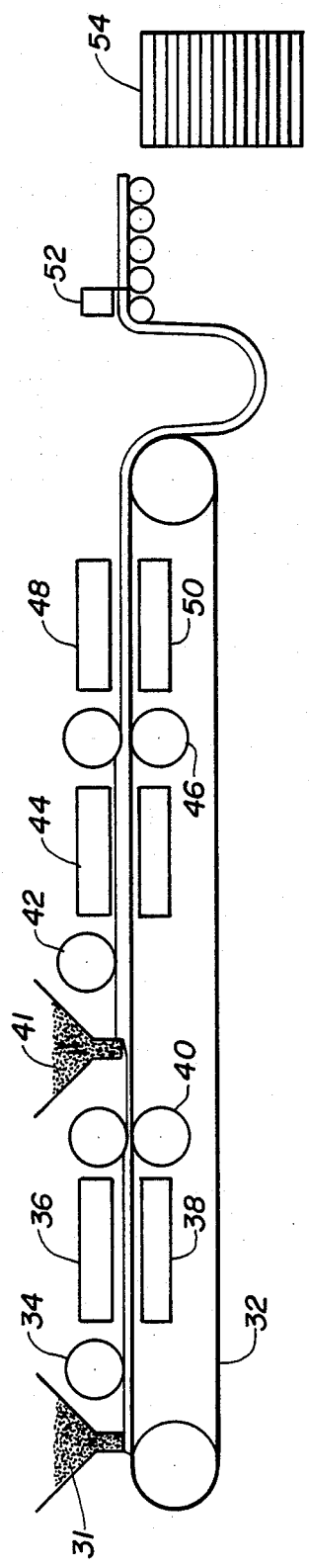
FIG. 4 is a schematic showing of a process for making one embodiment of the base material of this invention.

Referring to FIG. 4, whiter and more easily pressure and heat flowable dryblend and perlite Formula 1 (31) is deposited on a release surface carier 32 and using a screed roll 34 is leveled to 40 mils in thickness. Heat was then applied via infra-red irradiation 36 on the top surface and electric heating of the lower platen 38 for a period of 1 minute to bring the mixture to a temperature of about 375° F. to partial melt the surface portions of the dryblend granules and cause them to stick together and to the perlite at their points of contact. Light consolidation provided by a water-cooled steel roll apparatus 40 reduces the thickness of this layer to 16–18 mils. The resulting first layer (Formula 1) is highly pigmented, porous, and flows more readily than Formula 2. It is of a higher density than Formula 2. Formula 2 (41) dryblend and perlite mixture is deposited over the continously conveyed and heated first layer and using a second screed roll 42 is reduced to a thickness of 125 mils. Additional heat mainly in the form of top infra-red irradiation 44 and additional light consolidation provided by roll apparatus 46 produces a porous second layer having a thickness of 100 mils. After the application of cooling provided by apparatus 48 and 50, the composite sheet was released from the carrier and cut into mats (54), 7"×7" in size. The resulting composite is low density, contains two porous dryblend and perlite layers, and is in a suitable condition for further processing procedures.

A 4 mil thick rigid poly(vinyl chloride) film designated CD 805 BT manufactured by American Hoechst, Delaware City, Del., is printed with vinyl inks in a decorative pattern and the solvents are removed by hot air drying. During printing the film does not exceed a web temperature of 110° F. above which it is difficult to maintain print registration. In order to insure adequate bonding of the decorated film to the highly filled base, an adhesive is applied in the first and last stations in the printing sequence. The adhesive may be an acrylic type lacquer having the following composition:

| | Parts by Weight |
| --- | --- |
| *A21LV Resin | 13 |
| Ethyl Acetate | 43 |
| Methylethyl Ketone | 13 |
| | 69 |

*A methyl methacrylate resin available from Rohm & Haas, Philadelphia, Pennsylvania.

The printed film is slit and sheeted to sizes corresponding to the sizes desired for embossing. The sized film is perforated using a pin roll to provide a plurality of openings spaced on 1" centers.

Figure 3:
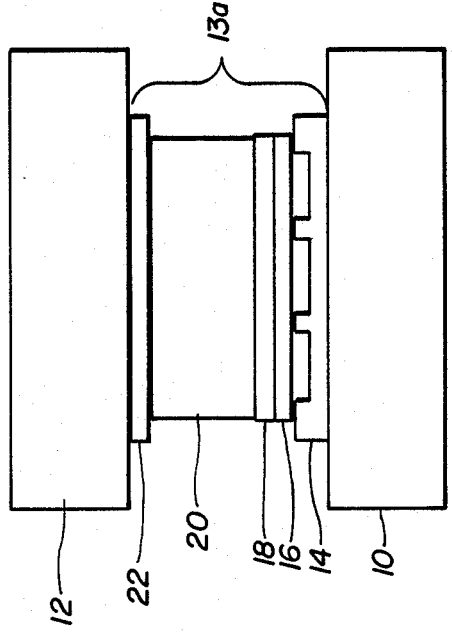

Looking at FIG. 3, an embossable assembly 13a is formed by positioning the printed film 24 in-register to the embossing plate 14, the unprinted surface making contact with the embossing plate. The composite sheet with the side corresponding to the Formula 1 layer 28 is placed next to the printed surface 26 of the perforated and decorated rigid vinyl film 24. Finally a Teflon sheet 22 is placed on the back side of the base material composite Formula 2 (30). There is therefore formed an embossing assembly which is moved from a hot embossing press to a cold embossing press. The embossing of the structure, fusing of the resins, die cutting to remove excess trim, and application of adhesive and release paper to the back of the product were done in the same manner and using the same materials as in Example I.

In this example, as pressure is applied in the first heated embossing press, the trapped air escapes through perforation holes in the printed film and composite base material. The heat then fuses the resins of layer 28 of the base layer which is comprised of Formula 1 and allows the holes to seal under continuing heat resulting in an impermeable surface. Also, the adhesive layer applied during the printing sequence of the decorated rigid vinyl film 24 activates under the heat and pressure of these simultaneous laminating and embossing steps to result in a stress-free, decorated, embossed surface covering having non-curling tendencies.

Herein it has been found that by the use of a rigid vinyl material having a plasticizer level of 3 to 5 percent, it is possible to form a stress-free wear surface. Other rigid materials such as acrylics, polycarbonates, polyesters, etc. could be utilized in lieu of the rigid vinyl, but the rigid vinyl is the preferred material for use. The use of the rigid vinyl and the two stage embossing operation permits the forming of a product that generally has a stress-free structure and thus will not curl or result in raised corners in the resultant finished product.

What is claimed is:

1. A process for making a stress-free embossed and ornamented surface covering comprising:
   (a) providing a rigid resinous thermoplastic vinyl film having a 3 to 5% plasticizer level on a release carrier, said film being permeable prior to embossing due to having a plurality of openings extending therethrough, said film having design portions on the surface thereof facing away from the release carrier, said resinous thermoplastic film being rigidly supported;
   (b) providing a low-density, porous, thermoplastic resinous base material having top and bottom surfaces;
   (c) interfacing the design bearing film surface with the top surface of the base material;
   (d) separating the release carrier from said film; and
   (e) embossing deeply with an embossing plate the film and base material while applying heat and pressure thereto to fuse the resinous material and to seal the film openings to render the film impermeable due to melting and flowing of the film, said embossing being carried out in a two-stage operation where the film and base material is first embossed in a hot embossing operation with the face of said embossing plate being raised to the temperature of approximately 320° F. wherein the rigid vinyl is raised above its glass transition temperature to stress relieve the vinyl and to provide the vinyl with appropriate embossed configuration, and then immediately removing said film in contact with the embossing plate and base material from said hot press and placing it in a cold press wherein said embossing plate cools to a temperature of approximately 100° F. to bring the temperature of the rigid vinyl down below its glass transition temperature so that the product will cool in its embossed shape and no stresses will be developed therein.

2. A process for making a stress-free embossed, ornamented surface covering as set forth in claim 1 wherein a second, but non-rigid, resinous thermoplastic film being permeable prior to embossing, is positioned between the rigid resinous thermoplastic film and the base material.

3. A process for making a stress-free embossed, ornamented surface covering as set forth in claim 1, wherein second porous thermoplastic resinous base material, of a low density, but of a higher density than the first provided base material, is positioned between the rigid resinous thermoplastic film and the first provided base material.

* * * * *